United States Patent
Balmer et al.

[15] 3,706,241
[45] Dec. 19, 1972

[54] INSULATION STRIPPER FOR RIBBON CABLE

[72] Inventors: John D. Balmer, New Cumberland, Pa.; Jerry A. Kendall, Garland, Tex.

[73] Assignee: Berg Electronics, Inc., New Cumberland, Pa.

[22] Filed: Oct. 21, 1970

[21] Appl. No.: 82,575

[52] U.S. Cl. .................................................. 81/9.51
[51] Int. Cl. ................................................ H02g 1/12
[58] Field of Search ............................ 81/9.51, 9.5 A

[56] References Cited

UNITED STATES PATENTS

| | | | |
|---|---|---|---|
| 1,733,294 | 10/1929 | Cross | 81/9.51 |
| 2,934,982 | 5/1960 | Eubanks | 81/9.51 |
| 2,497,112 | 2/1950 | Andren | 81/9.51 |
| 3,309,948 | 3/1967 | Falken | 81/9.51 |
| 3,515,018 | 6/1970 | Metcalf | 81/9.5 A |

*Primary Examiner*—James L. Jones, Jr.
*Attorney*—Thomas Hooker

[57] ABSTRACT

Disclosed is an apparatus for stripping the insulation from wires in a ribbon cable. The wires at the end of the cable are positioned between a pair of jaws. The jaws include orienting means for accurately locating the individual wire conductors so that upon closing of the jaws pairs of cutters sever the insulation on the wires without severing the metal conductors. An additional cutter trims the conductor ends. Following closing of the jaws, the cable is pulled from between the cutters to strip the insulation from the trimmed ends of the conductors. Subsequently terminals may be attached to the stripped and trimmed ribbon cable conductors.

8 Claims, 12 Drawing Figures

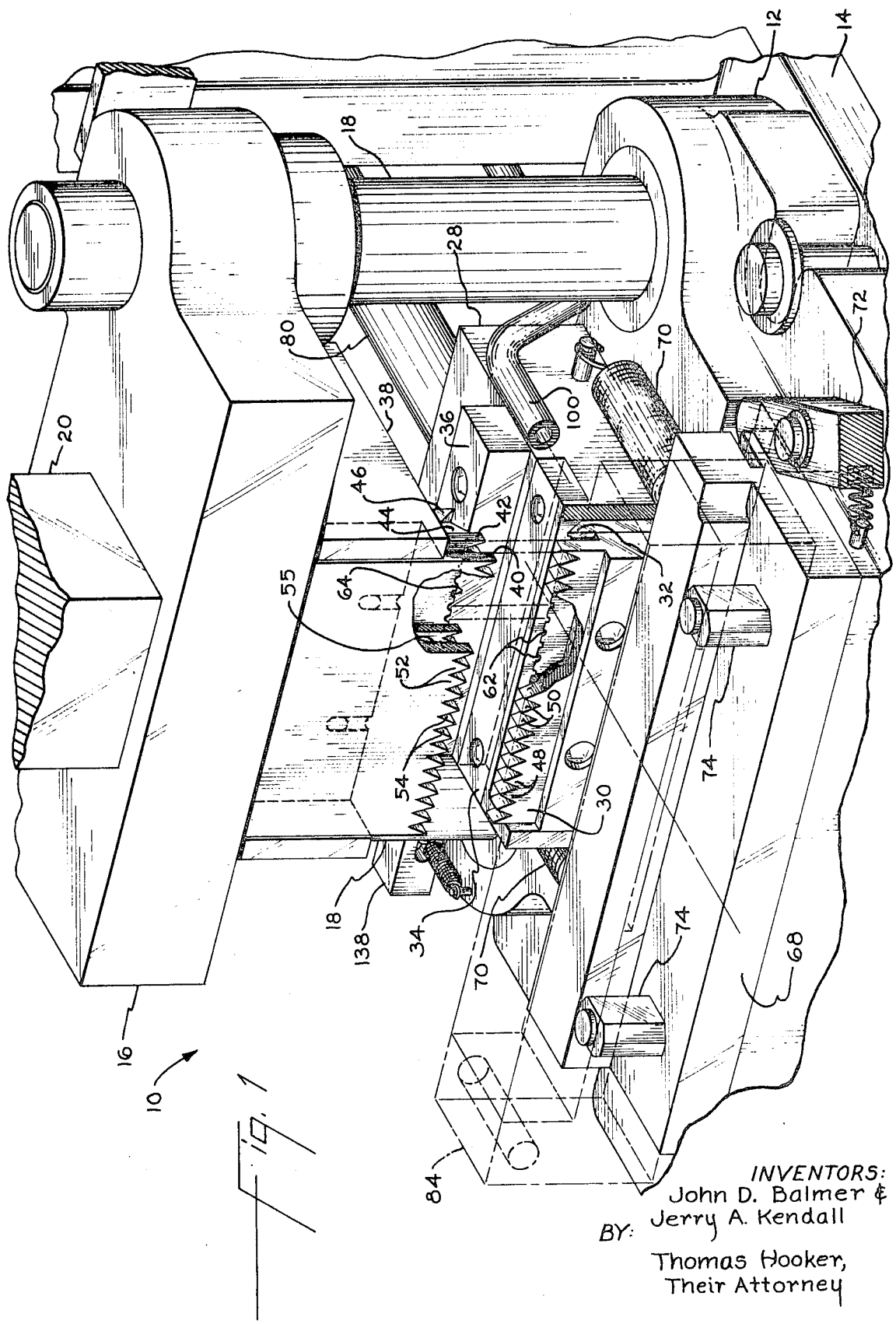

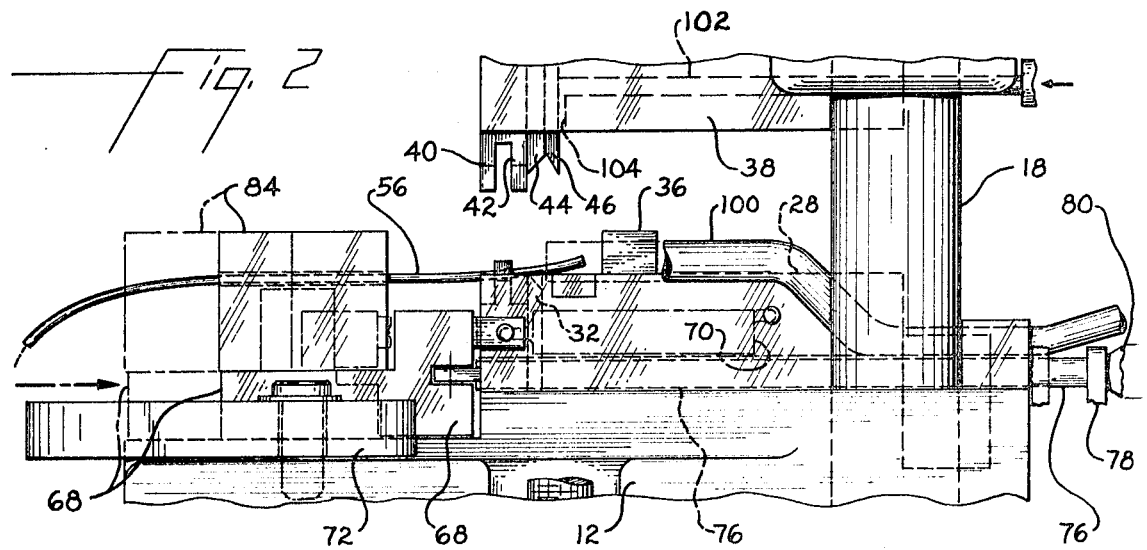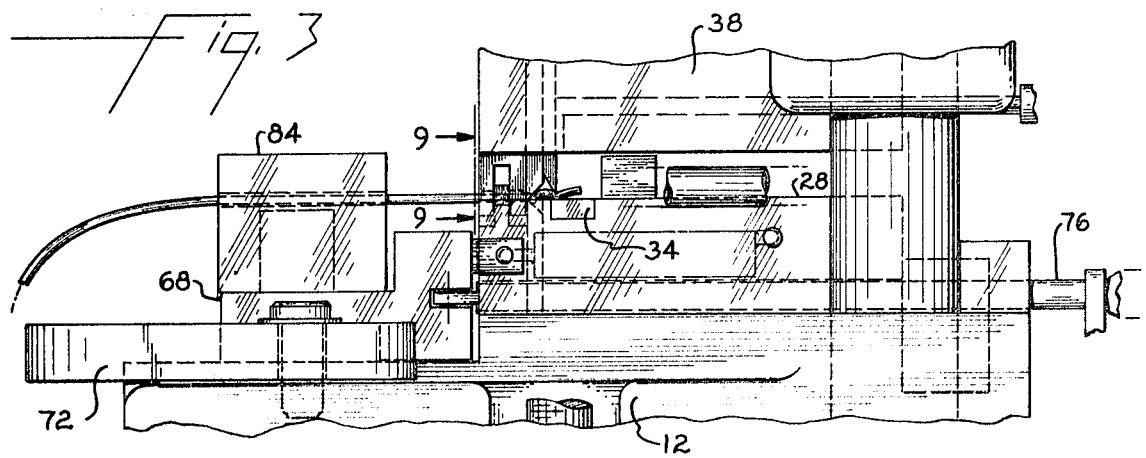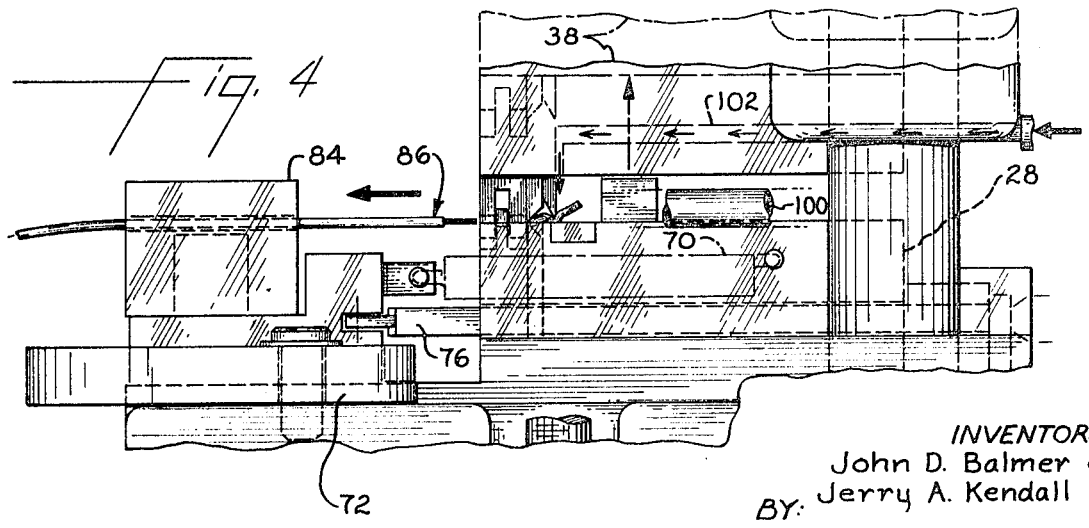

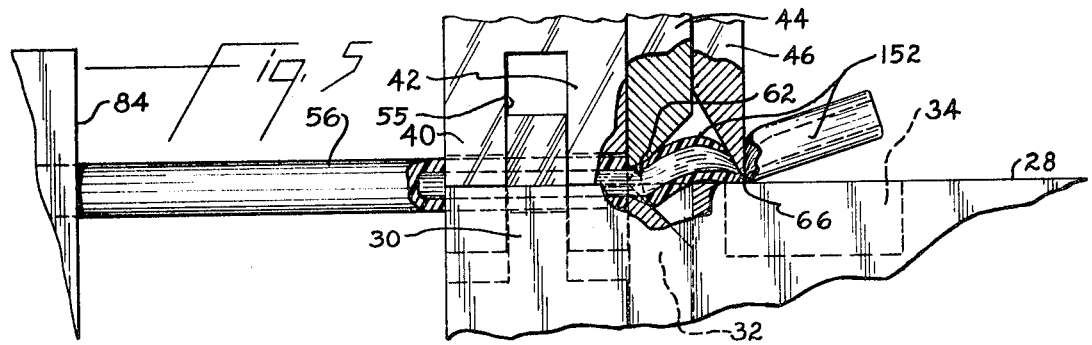
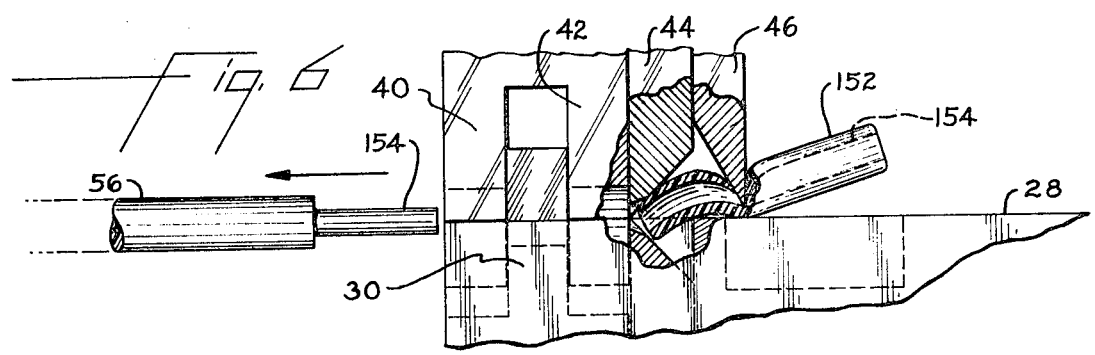
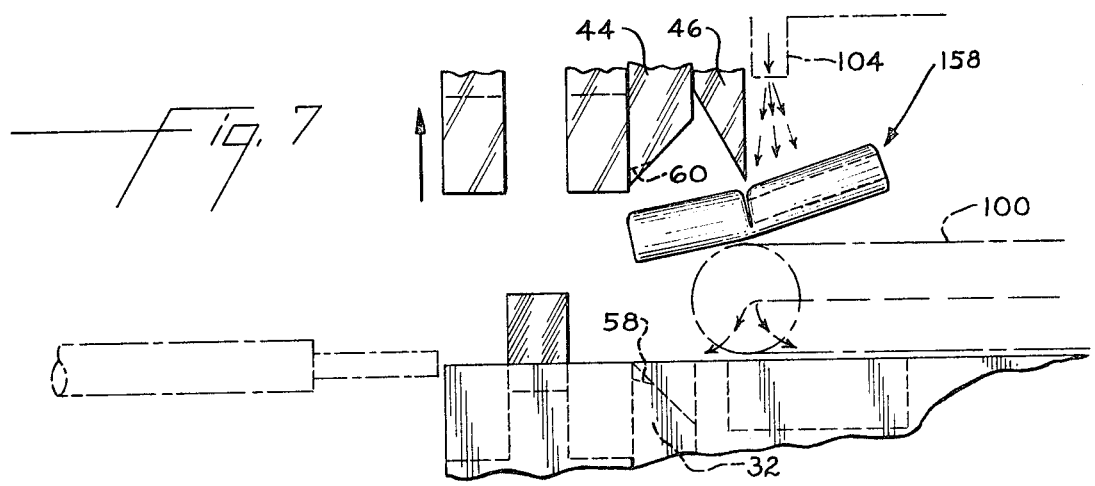
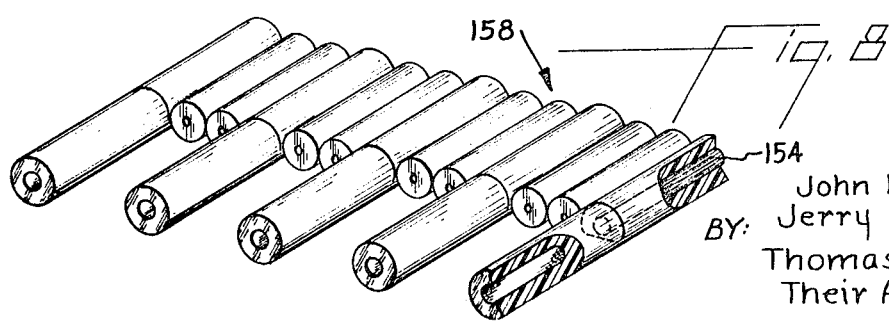
INVENTORS:
John D. Balmer &
Jerry A. Kendall
BY: Thomas Hooker,
Their Attorney

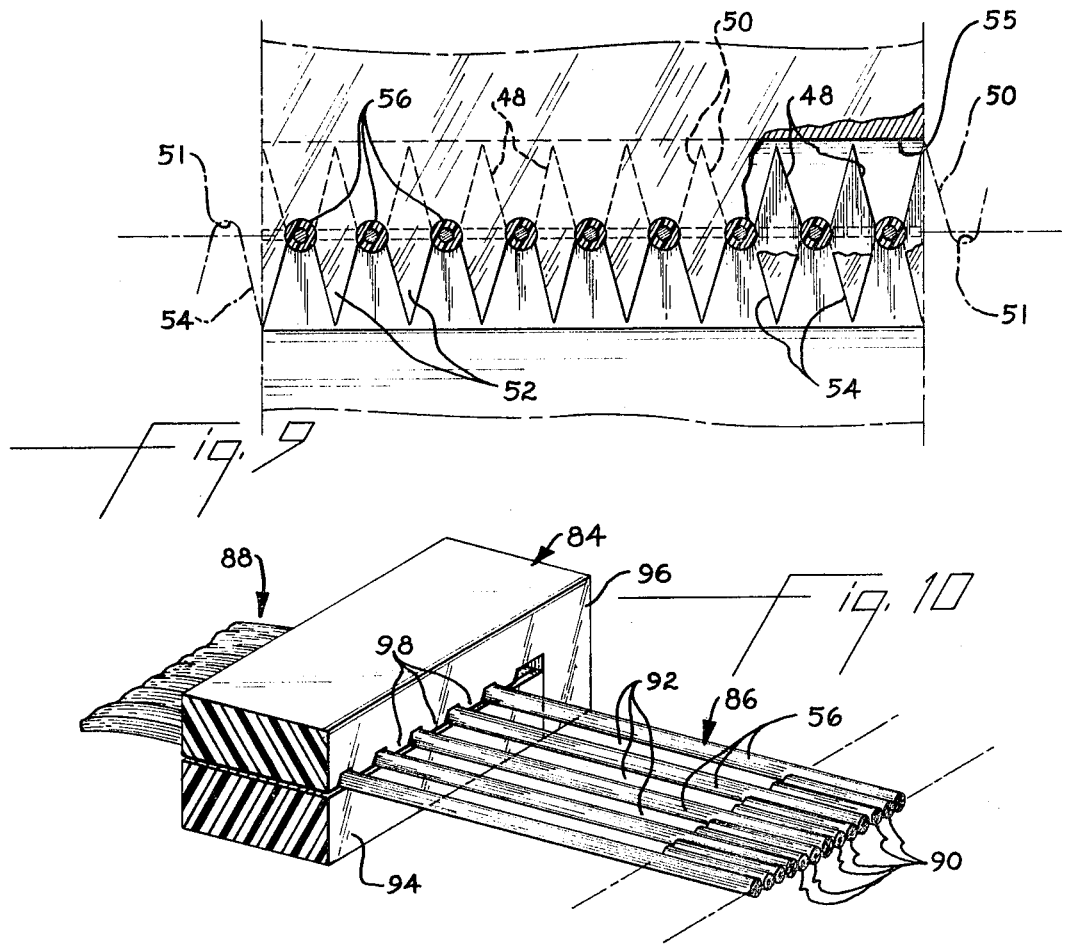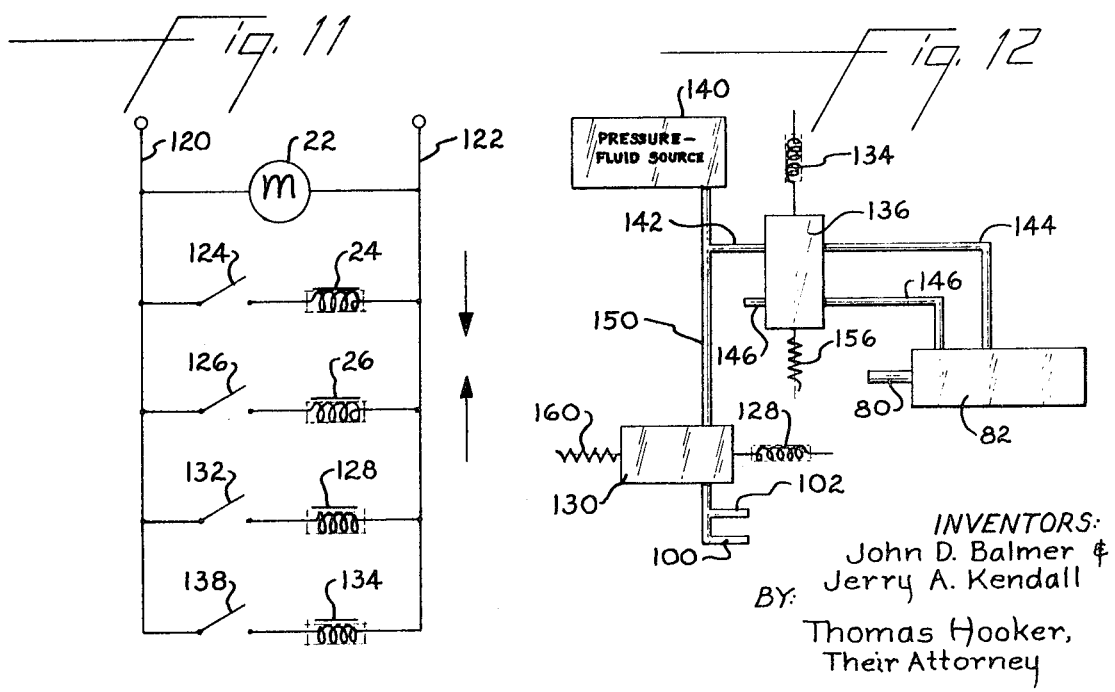

INSULATION STRIPPER FOR RIBBON CABLE

The invention relates to a press type insulation stripper used to trim and strip the conductors at the end of a ribbon cable. In a previous operation the insulation between adjacent conductors in the cable has been blanked out of the cable. A suitable blanking apparatus is disclosed in U.S. Pat. No. 3,577,116 Bergand Kendall. The blanked ribbon cable is mounted on a moveable slide so that the conductor ends extend between a pair of open jaws. The conductors are positioned so that they lie within the valleys between a row of teeth on the lower jaw. The upper jaw carries two rows of spaced teeth which cooperate with the lower jaw teeth when closed to accurately confine the insulated wires of the ribbon cable in known locations so that the ends of the wires projecting past the teeth are oriented properly with respect to a pair of cutters. The sharp cutting edges on the cutters are recessed so that when closed they sever the insulation on the wires without cutting the interior conductors. Another cutting edge located further away from the teeth than the cutters completely severs the interior conductors.

Following closing of the jaws the ribbon cable is pulled out from between the jaws so that the severed insulation is stripped from the cable to expose the ends of the conductors. Terminals may then be crimped to the stripped and trimmed conductors.

Other objects and features of the invention will become apparent as the description proceeds, especially when taken in conjunction with the accompanying drawings illustrating the invention, of which there are four sheets.

IN THE DRAWINGS:

FIG. 1 is a perspective view of the insulation stripper with the jaws open and the cable clamp illustrated schematically;

FIG. 2, 3 and 4 are side views of the insulation stripper illustrating three steps in the cycle of operation of the stripper;

FIGS. 5, 6 and 7 are enlarged views illustrating the operation of the insulation stripper;

FIG. 8 is a partially broken away perspective view of that portion of the ribbon cable which is severed and stripped during operation of the insulation stripper;

FIG. 9 is a view taken along line 9—9 of FIG. 3;

FIG. 10 is a broken away perspective view of a clamp used to hold the ribbon cable; and FIGS. 11 and 12 are schematic views of the electrical and pneumatic circuitry of the insulation stripper.

Insulation stripper 10 as illustrated in FIG. 1 includes a fixed base 12 mounted on top of a support 14. Upper plate 16 is mounted on posts 18 by means of bearings so that it may be moved toward and away from plate 12. Mounting post 20 on the upper surface of plate 16 is secured to the ram of a punch press (not illustrated) which is used to drive plate 16 toward and away from plate 12. The punch press is typically driven by an electric motor 22, indicated schematically in FIG. 11, through a solenoid actuated 180° clutch. When clutch solenoid 24 is actuated, motor 22 operates the punch press to move plate 16 from the rest position illustrated in FIG. 1 toward plate 16. At the bottom of the press stroke the clutch is automatically disengaged. When the clutch solenoid 26 is energized, the clutch is again engaged to raise plate 16 from the lowered position back to the rest position.

Mounting block 28 is secured to plate 12 between posts 18 with a wire orienting comb 30 and a lower insulation cutter 32 secured to the side of the block facing the front of the stripper. A cutting block 34 is secured in the upper surface of block 28 adjacent the comb and cutter. Spacer 36 is mounted on the top of the block.

Upper mounting block 38 is secured to the lower surface of plate 16 and carries a pair of spaced upper conductor orienting combs 40 and 42 which are formed from a single part. An upper insulation cutter 44 is located immediately behind comb 42. Conductor cutter 46 is located behind cutter 44 and above cutter block 34.

Wire orienting teeth 48 extend along the top of comb 30 at regular intervals and define V-shaped valleys 50 between adjacent teeth. Likewise, the lower edges of upper combs 40 and 42 are provided with regularly spaced teeth 52 defining conductor orienting V-shaped recesses 54 therebetween. Each valley 54 on the upper combs is located immediately above a valley 50 in the lower comb so that when the plate 16 is lowered by the press and teeth 48 extend into recess 55 between the two rows of teeth 52, the combs accurately orient the individual insulated conductors of the ribbon cable. This position is illustrated in FIG. 9. The bottoms of the valleys 50 and 54 are rounded so that the insulated conductors 56 are snugly confined between the combs. As illustrated in FIG. 9 the conductors are tightly clamped between the combs so that the wire diameter is reduced somewhat.

Insulation cutters 32 and 44 are provided with sharp cutting edges 58 and 60 respectively which are located immediately behind the upper comb 42. Recesses 62 and 64 are formed in edges 58 and 60 with each recess located immediately behind the center line of the immediately adjacent comb recess. When the combs and cutters are brought together, the combs align the insulated wires and the cutters sever the insulation without severing the conductors. The conductors lie within a pair of recesses 62 and 64. The edges of recesses 62 and 64 are sharp so as to cooperate with edges 58 and 60 in severing the conductor insulation.

When plate 16 is bottomed as illustrated in FIG. 5, the sharp cutting edge 66 of cutter 46 partially severs the insulation of the wires 56 and completely severs the conductors within the wires. Cutting edge 66 is spaced from the cutting edge of cutters 32 and 44 so that a length of the conductors in insulated wires extends beyond the insulation cutters. Block 36 prevents accidental bottoming of cutter 46 on insert 34.

A slide 68 is mounted upon base 12 and is moveable toward and away from block 28. Springs 70 bias the slide toward the block. A spring latch 72, mounted on plate 12, is used to hold the slide away from the block as illustrated in FIG. 1. When the latch is released the springs 70 pull the slide toward the block until the slide engages a stop, as illustrated in FIGS. 2 and 3. A pair of clamp orienting pins 74 project upwardly from the slide.

A pair of rods 76, only one of which is illustrated, are secured to slide 68 and extend from the slide to the back of the insulation stripper. A bar 78 joins rods 76. Piston rod 80 of air cylinder 82, illustrated schematically in FIG. 12, engages bar 78 so that upon extension of the air cylinder the slide 68 is moved away from the tooling mounted on blocks 28 and 38. When the air cylinder is fully extended the slide is moved away from the block sufficiently to permit the spring biased latch 72 to engage the slide and prevent springs 70 from moving the slide back toward the blocks.

FIG. 10 illustrates a tape cable clamp 84 useful for positioning end 86 of ribbon cable 88 so that the individual insulated wires 56 thereof may be severed and stripped by the apparatus 10. Ribbon cable 88 is made up of a number of insulated conductors 56 which are spaced apart by insulating material 90. In a previous operation the insulating material 90 between the insulated wires has been blanked from the ribbon cable to form recesses 92. Clamp 84 includes two parts 94 and 96 which extend across the width of cable 88 to clamp the blanked portion of the ribbon cable therebetween. The clamp face of part 96 is provided with spaced ridges 98 so that when the clamp is closed the insulated wires 56 are confined within the valleys between the ridges in a known orientation. After the cable 88 is secured in the clamp 84 the clamp may be mounted on the posts 74 of slide 68 with the blanked cable end 86 projecting toward the open jaws of the apparatus 10.

A pair of compressed air lines 100 extend to either side of block 28 and are provided with nozzles, not illustrated, which direct a flow of air toward the cutters when the leads are pressurized. Pressure leads 102 formed in upper block 38 extend to nozzles 104 adjacent cutter 46 so as to direct a stream of air down toward block 28 when pressurized.

FIG. 11 illustrates the electrical circuitry of the insulation stripper 10. Leads 120 and 122 are connected to an electrical power source through a conventional on/off switch. The leads of press motor 22 are connected to power leads 121, 122 to energize the motor. Solenoid 24 is connected between leads 120 and 122 by normally open switch 124 and solenoid 126 of the clutch is connected between the lower leads by normally open switch 126. Solenoid 128 of spring return solenoid control valve 130 is connected between leads 120 and 122 by normally open microswitch 132 and solenoid 134 of spring return solenoid control valve 136 is connected between leads 120 and 122 by normally open microswitch 138.

FIG. 12 illustrates the pneumatic circuitry of the insulation stripper 10. Pressure fluid source 140 is connected to four-way spring return solenoid control valve 136 by lead 142. Leads 144 and 146 extend between valve 136 and air cylinder 82. The valve is vented by lead 148. Pressure lead 150 extends between the pressure fluid source 140 and spring return solenoid control valve 130 so that when solenoid 128 is actuated leads 100 and 102 are pressurized to direct a flow of air to the area of cutters 32, 44 and 46.

OPERATION OF THE INSULATION STRIPPER

At the beginning of the cycle of operation of apparatus 10 plate 16 is located in the rest position above plate 12 as illustrated in FIG. 1 and combs 40 and 42 and cutters 44 and 46 are located above comb 30, cutter 32 and the cutter bar 34 in block 28. Slide 68 is held in position away from block 28 by latch 72. With the apparatus in this position the operator positions the blanked end 86 of a ribbon cable 88 in the cable clamp 84 as illustrated in FIG. 10 and then positions the clamp and cable on posts 74 of slide 68 as indicated in dotted lines in FIG. 1. In this position the end 86 of the cable projects toward the open tooling. Latch 72 is then released to permit spring 70 to move the slide 68, clamp 84 and exposed end 86 of the ribbon cable toward the tooling to the position illustrated in FIG. 2 of the drawings.

With the slide 68 in this position the individual insulated wires 56 of end 86 lie within the valleys 50 between teeth 48 of lower comb 30. The clamp 84 is located on slide 68 so that the valleys between the clamp ridges 98 are in alignment with the valleys 50 between comb teeth 48. The individual insulated wires 56 extend essentially perpendicularly from the clamp 84 so that they lie within or immediately above the valleys 50 in the comb. The width of the valleys at the points of teeth 48 is sufficiently greater than the diameter of the insulated wires 56 to assure that each wire lies in its respective valley.

Following releasing of latch 72 and movement of the slide toward block 28, the operator closes normally open switch 124 to momentarily energize clutch solenoid 24. Upon energization of this solenoid the 180° punch press clutch is engaged and the plate 16 is lowered from the position of FIG. 1 to the bottom of its stroke toward plate 28 which is illustrated in FIG. 3. The relationship of the combs and cutting tooling when the press is bottomed is illustrated in enlarged FIG. 5. When the press is fully bottomed the 180° clutch disengages leaving apparatus 10 in the position of FIG. 3.

As the press lowers the fingers 52 of the upper combs 40 and 42 surround the individual conductors 56 of cable end 86. Further lowering of the press to the bottom position assures that the conductors are positively confined in the bottoms or valleys 51 of the recesses between the fingers on the three combs as illustrated in FIGS. 3, 5 and 9. In this way the location of the insulated wires is positively assured and severing of the wire insulation does not result in unwanted severing of the conductors.

As the press bottoms, but subsequent to accurate location of the conductors 56 between the fingers on the combs, the cutting edges of cutters 32 and 44 sever the insulation 152 surrounding the conductors 154 in the individual wires. The recesses in the cutters 32 and 44 are provided with sharp edges so that when the cutters fully bottom, as shown in FIG. 6, the flat cutting edges 60 thereof come together and cooperate with the cutting edges of the recesses 62 and 64 to completely sever the insulation 152 without severing the metal conductors 154.

With lowering of the upper tooling, cutter 46 is lowered until it engages the wires 56 which are backed by cutting plate 34, and the cutting edge 66 thereof partially severs the insulation 152 and completely severs the conductors 154. As illustrated in FIG. 5, when the tooling is at the bottom of the downward stroke, the cutting edge 66 of cutter 46 does not engage block 34 so that the insulation 152 to either side of the cutting edge is not cut apart.

When the press is bottomed and the position of FIGS. 3, 5 and 9 has been reached, normally open microswitch 138 is closed by a trigger moveable with plate 16 so as to energize solenoid 134 and shift solenoid control valve 136 against spring 156 so that lead 144 is pressurized and lead 146 is vented through lead 148. Shifting of valve 134 extends air cylinder 82 so that the piston rod 80 thereof is brought into engagement with bar 78 to push slide 68 with tape clamp 84 thereon away from the comb and cutter tooling until latch 72 is engaged. FIG. 3 illustrates the position of the slide and cable clamp before it is moved away from the tooling and FIG. 4 illustrates the position of the slide and clamp following movement away from the tooling.

The cable clamp 84 grips the cable with ribs 98 projecting into the previously blanked slots 92 immediately adjacent the ends of the slots away from cable end 86. Thus, as air cylinder 82 moves the slide and clamp away from the tooling the clamp tightly engages the cable and pulls the insulated wires 56 from between the combs and the closed cutters 32 and 44. The wire insulation located to the right of the closed cutters 32 and 44 in FIG. 5 has been completely severed from the insulation to the left of the cutters. As illustrated, cutter 46 has severed the portion of the conductor to its right without completely severing the insulation. Thus, as the clamp 84 is moved to the left away from the comb and cutter tooling, the insulation and the severing end of the wire 154 are held in place. Movement of the block strips the severed insulation from the wire 154 so that each end of the insulated conductors 58 is stripped and trimmed. In this operation a single trimmed portion 158 has been removed from the end of the conductors 56.

Following movement of the tape clamp and slide to the left to the latched position shown in FIG. 4, the operator closes normally open switch 126 to actuate solenoid 26 thereby engaging the press clutch for the duration of 180° and causing the plate 16 to be raised from the bottomed position to the rest position of FIG. 1. Raising of the plate closes microswitch 138 thereby deactivating solenoid 134 and allowing spring 156 to shift valve 136 so that the air cylinder 82 is retracted.

As the press raises, normally open microswitch 132 is closed to energize solenoid 128 thereby shifting control valve 130 against spring 160 to provide a blast of air through leads 100 and 102 as illustrated in FIG. 7. This blast clears the stripped portion 152 of the cable end 86 from the cutter tooling and ejects it from the machine. The stripped portion 158 has a tendency to stick to the cutter tooling so that it is useful to provide an air blast which assures removal of the portion from the apparatus. Because the ends of the individual insulated conductors 56 are joined together by insulators 90, trimming of each cable 88 results in a single piece of trimmed material rather than a piece of trimmed material for each of the conductors in the cable. Because of this the clean-up and disposal of the trimmed portions of the tape cables is simplified.

As the press continues to raise plate 16, microswitch 132 is closed thereby de-energizing solenoid 128 and allowing spring 160 to shift valve 130 to turn off the blast of compressed air through leads 100 and 102. When the press reaches the top of the stroke, the 180° clutch is automatically de-energized to complete the cycle of operation of the insulation stripper. The operator may then remove the cable clamp 84 from slide 68, open the clamp, remove the trimmed cable and mount another cable to be trimmed in the clamp. The clamp may then be repositioned upon the slide and the cycle of operation may then be repeated. Terminals may be applied to the trimmed and stripped wires 154.

While we have illustrated and described a preferred embodiment of our invention, it is understood that this is capable of modification, and we therefore do not wish to be limited to the precise details set forth, but desire to avail ourselves of such changes and alterations as fall within the purview of the following claims.

What I claim my invention is:

1. Apparatus for stripping insulation from conductors in a ribbon cable comprising a base, a drive plate adjacent said base, means for moving the drive plate toward and away from the base, cutting means for severing the insulation surrounding the conductors of a ribbon cable without severing the conductors including a part on said base and an opposed part on said drive plate, one of said parts of said cutting means having a sharp insulation cutting edge facing said other part with sharp edged conductor receiving recesses formed therein, the other part having a ribbon cable support opposite said edge whereby said parts cooperate to at least partially sever the insulation surrounding the ribbon cable conductors without severing the conductors upon movement of the drive plate least one of said blades including a number of sharp base to bring said parts together, ribbon cable holding means on the base, conductor alignment means for aligning the insulated conductors in a ribbon cable in said holding means relative to said recesses prior to closing of said parts, and means for moving the holding means away from the cutting means to pull the conductors past said parts when closed to strip the insulation from the conductors.

2. Apparatus as in claim 1 including trimming means for severing the conductors in the ribbon cable.

3. Apparatus as in claim 1 wherein said conductor alignment means comprises an alignment plate on both said drive plate and base, each such alignment plate having a number of conductor receiving recesses arranged therealong to receive and orient the conductors in the ribbon cable on the base, each of said conductor receiving recesses in each alignment plate being aligned with one of said sharp edged recesses.

4. Apparatus as in claim 3 wherein said conductor receiving recesses are generally V-shaped having a maximum width greater than the lateral dimensions of the conductors and a bottom adapted to confine the conductors in alignment with said sharp edged recesses.

5. Apparatus as in claim 3 wherein said means for withdrawing the conductors comprises a moveable slide on said base, and tape cable mounting means on said slide.

6. Apparatus for stripping insulation from around the conductors of a ribbon cable comprising a press having a base, a support and means for moving the base and support toward and away from each other, a conductor alignment plate on each of said base and support, each plate including a row of aligned conductor orienting recesses with each recess in the plate on the support positioned above a recess in the plate on the base whereby movement of the support toward the base brings said plates together so that the conductors are accurately confined in the bottoms of said recesses at known locations, opposed insulation cutter blades mounted on said support and said base to one side of said plates, each blade including a sharp cutting edge, and at a number of sharp sharp edged recesses, said recesses being located along such edge in alignment with the recesses in said plates, and means for mounting a ribbon cable on said base so that the insulated conductors thereof extend between said plates and said cutter blades when separated whereby upon movement of said support toward said base, said insulated conductors are accurately aligned in said plate recesses and said cutters close to at least partially sever the insulation surrounding said conductors without severing the conductors.

7. Apparatus as in claim 6 including means for moving said mounting means away from said plates and blades when closed so as to pull said conductors from between said plates and strip insulation from said conductors.

8. Apparatus as in claim 7 including cutting means for trimming the ends of said conductors.

* * * * *